(12) United States Patent
Lidin et al.

(10) Patent No.: US 9,065,702 B2
(45) Date of Patent: Jun. 23, 2015

(54) METHOD AND SYSTEM FOR A COMMUNICATION SESSION INITIALIZATION IN A TELECOMMUNICATION NETWORK

(71) Applicant: Telefonaktiebolaget L M Ericsson (Publ), Stockholm (SE)

(72) Inventors: Jan Lidin, Huddinge (SE); Fredrik Pejmo, Sollentuna (SE); Jan Hultkrantz, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 381 days.

(21) Appl. No.: 13/663,603

(22) Filed: Oct. 30, 2012

(65) Prior Publication Data

US 2013/0107875 A1     May 2, 2013

Related U.S. Application Data

(62) Division of application No. 12/526,762, filed as application No. PCT/EP2007/059192 on Sep. 3, 2007, now abandoned.

(51) Int. Cl.
*H04L 29/06* (2006.01)
*H04L 12/58* (2006.01)

(52) U.S. Cl.
CPC ........ *H04L 29/06326* (2013.01); *H04L 12/581* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 7,085,258 B2 * | 8/2006 | Creamer et al. | 370/352 |
| 7,548,756 B2 * | 6/2009 | Velthuis et al. | 455/466 |
| 7,684,356 B2 * | 3/2010 | Wu | 370/260 |
| 7,804,948 B2 * | 9/2010 | Turner | 379/204.01 |
| 8,325,708 B2 * | 12/2012 | Lim et al. | 370/352 |
| 2002/0071539 A1 * | 6/2002 | Diament et al. | 379/202.01 |
| 2003/0126207 A1 * | 7/2003 | Creamer et al. | 709/204 |
| 2005/0213724 A1 * | 9/2005 | O'Brien et al. | 379/202.01 |
| 2007/0099637 A1 * | 5/2007 | Mangla et al. | 455/466 |

FOREIGN PATENT DOCUMENTS

| | | | |
|---|---|---|---|
| WO | WO 2004095818 A1 | * | 11/2004 |
| WO | WO 2005062912 A2 | * | 7/2005 |

\* cited by examiner

*Primary Examiner* — Robert C Scheibel

(57) ABSTRACT

A method, Call Agent (CA), and circuit-switched terminal for setting up a multimedia session from the circuit-switched terminal toward a packet-switched terminal in a telecommunication network. An Instant Messaging (IM) server receives an IM message from the circuit-switched terminal and forwards the contents of the IM message to the CA. The CA generates or retrieves a unique call token that identifies the terminals, and sends the call token to the IM server, which forwards the token to the circuit-switched terminal. In response, the circuit-switched terminal initiates setup of a circuit-switched call to an identified Media Gateway Controller (MGC). The MGC then sets up a packet-switched session with the packet-switched terminal to complete the setup of the multimedia session.

11 Claims, 7 Drawing Sheets

METHOD AND SYSTEM FOR A COMMUNICATION SESSION INITIALIZATION IN A TELECOMMUNICATION NETWORK

RELATED APPLICATIONS

This application is a divisional of U.S. patent application Ser. No. 12/526,762 filed Jan. 11, 2010, which is a 371 of International Application No. PCT/EP2007/059192, filed Sep. 3, 2007, the disclosures of which are fully incorporated herein by reference.

The present invention relates to method for initializing a media session by a first terminal having a first address to a second terminal, the first and the second terminal being associated with a telecommunication network, wherein the network is arranged for establishing media sessions with the terminals. The present invention also relates to corresponding devices and software.

BACKGROUND OF THE INVENTION

Traditional Circuit Switched (CS) telecommunication networks, such as Public Switched Telecommunication Network (PSTN), Integrated Services Digital Network (ISDN) or Public Land mobile Network (PLMN) implemented as e.g. a Global System for Mobile communications (GSM) do nowadays co-exist with recently developed Packet Switched (PS) telecommunication networks, such as the Internet where e.g. Voice over Internet Protocol (VoIP) voice calls are applied.

VoIP cells are considered as an inexpensive way to communicate while CS calls are considered to be more expensive but to have a better, generally worldwide coverage. Furthermore a substantial amount of CS network operators offer mobile services, extending the attractiveness of CS communication.

As both PS- and CS-networks offer substantial benefits for a user of a communication device, integration of both networks into one telecommunication network took off in the early nineties by means of Media Gateway (MGW) devices connecting CS and FS networks thereby enabling calls between both networks.

Voice calls initialized by means of a terminal at a CS network towards a terminal residing in PS a network could be made in the way described in patent application WO 2007/005124 A2. This patent application describes a method and system where a user, after authentication to a server, receives a contact list at his terminal, which list is applied to select a name of a person to be called at a PS network.

The patent application does not disclose how to initialize voice calls to a CS terminal, while benefiting from the contact list which is maintained at a server residing at the PS network.

In case PS- and CS networks are integrated into a one telecommunication network, a user requiring communication to a party has to select either the CS- or PS-network depending where a communication device of the party is attached to. In case the party has a communication device attached to the PS network, a call setup has to be executed differently compared to a call setup where the party applies a communication device attached to a CS network, requiring additional knowledge and practice of the user to handle the user interface at his terminal.

Voice calls, regarded as a traditional communication method, provide a high level of interactive communication. A less interactive communication method known as messaging is implemented on e.g. computers and mobile CS terminals by application of an Instant Messaging and Presence (IM&P) protocol as defined by the Internet Engineering Taskforce (IETF). Use of both forms of communication methods at one terminal device requires different user practice as to control the user interface of his terminal, requiring still further knowledge and practice.

Present CS- and PS-networks comprise a number of devices and protocols that are standardized and operate with standardized communication protocols. A method to initialize a call such as in the prior art document above would require an additional server for maintaining the contact list. Installation of additional servers to a communication network increases complexity of the network and increases maintenance efforts.

SUMMARY

In view of the above problems it is therefore an object to provide methods, devices and computer programs to improve the initialization of media sessions in a telecommunications network.

A method is described for initializing one or more media sessions from a first terminal having a first address to a second terminal. The first and the second terminal are associated with a telecommunication network arranged for establishing media sessions of at least two different media types. The method, comprises the steps of:

selecting a first media type for the media session and a communication partner, where the partner is selected from a list of communication partners and the first media type is selected from a plurality of media types and where the selected communication partner has a second address associated with the second terminal. This second address is associated with either the first media type or a different media type.

composing a message comprising identifiers representing;
a) the first address of the first terminal,
b) the second address of the selected communication partner and
c) the selected first media type.

The message is composed according to a format defined by or protocol used by a second media type, wherein the second media type is different from the first media type, sending the message in a format and protocol defined by the second media type to a network node of the telecommunication network, where the network node is arranged to establish media sessions of the first media type. In this way the network node is supplied with said identifiers in order to establish a session of the selected first media type, between the first terminal and the second terminal according to the third identifier.

By applying a protocol of an existent medium such as a chatting medium provided by an Instant Messaging (IM) application, an advantageous solution is provided to initialize a different media session such as a voice, video or Multi Media call by means of existing infrastructure. The infrastructure is advantageously re-used, without the need for additional equipment, for non-standard communication protocols, and without substantial modifications or a restructured infrastructure.

For terminals that are capable of processing at least two different media such as Instant Messaging and voice, video or Multi Media calls, advantageously a single method is provided to initialize both media in the same way. In this way the user experiences a simple method to initialize communication by either medium without having to know or remember different user interfaces associated with each communication medium.

By having at least two communication media integrated at one device available to a user, the user is advantageously provided with the potential to make a simple selection which of the media to apply, based e.g. on costs or privacy reasons.

Furthermore the user is advantageously provided with a simple method to promote or demote the level of interactivity of an ongoing media session by simply selecting the desired medium during a session and continue the session at a changed level of interactivity. A voice, video or Multi Media session is considered to be more interactive than a message session.

The invention enables an effective and simple user interface to select an appropriate media type for his communication needs, such as e.g. voice calling, video calling, Multi Media session setup, chat messaging, Short Message Service (SMS) messaging, electronic-mail (e-mail) messaging, and to initialize each session in the same way, and additionally to change an ongoing media session of a first media type to another media session of another media type.

The invention can thus provide an improved ease of communication for end-users. A user, only knowing the address of a communication partner for a first medium type, e.g. IM, is enabled to setup a communication session at a second media type such as voice, video or Multi Media session to this partner without a search for the network address of the terminal associated with the second media type, of the partner.

A still further advantage that can be provided by the invention is that the user does not need to know in advance before initializing a voice, video or Multi Media session, what type of terminal technology is applied by the communication partner. The terminal of the partner can use any technology as long as the terminal is associated with a telecommunication network that is connected by an appropriate gateway or a series of gateways towards the telecommunication network of the user. The partner may apply a plurality of technologies e.g. an Internet based communication terminal device, such as e.g. a SIP-based phone or a H.323 based phone, or a Circuit Switched (CS) based communication terminal device such as a Plain Old Telephony System (POTS) phone or a Global System for Mobile communication (GSM) phone.

Further more a terminal is proposed which is associated to a telecommunication network, the terminal comprising an input device, an output device, a processing unit with internal memory, and at least one device adapted to be connected to at least one network node associated with the telecommunication network, the terminal arranged for initializing media sessions of at least two different media types, the terminal further arranged to present by means of the output device a list of communication partners, to select by means of the input device the communication partner from the list for a media session according to a first media type, to compose by means of the processing unit a first message comprising a first identifier representing a first address of the terminal, a second identifier representing a second address associated with the selected communication partner and a third identifier representing the selected first media type, the message composed according to a format defined by a second media type, the second media type being different from the first media type, and to send by means of the interface the first message according to a protocol of the second media type to the network node and where the network node is arranged to establish media sessions of the first media type between the terminal and the second terminal.

Furthermore a method is described, the method initiating a media session between a first terminal having a first address and a second terminal having a second address, the first and the second terminal being associated with a telecommunication network, the network is arranged for establishing media sessions with the terminals, and where the method comprises the steps of:

receiving a message comprising at least a first identifier representing the first address associated with a first party, a second identifier representing a second address associated with a second party and a third identifier representing a first media type of the session to be established, wherein the message is of a second media type and wherein the first and the second media types are different, resolving the first address comprised by the first identifier into an address associated to the media type according to the third identifier, initiating the media session of the media type according the third identifier between the first and the second terminal.

Furthermore a computer program product is described, the product loadable into internal memory of a terminal comprising a software code portion for performing the selecting, composing and sending steps as described above when said product is run on a processing unit of the terminal. The computer program product can be stored on a computer readable medium that is either a permanent or a rewritable memory within the terminal. A functions performed by the computer program product may also be implemented in hardware.

In the following, advantageous embodiments of the present invention shall be described with reference to the enclosed drawings in order to give the skilled person a full and complete understanding. However these embodiments are illustrative and not intended to be limiting.

DETAILED DESCRIPTION

Figure 1:
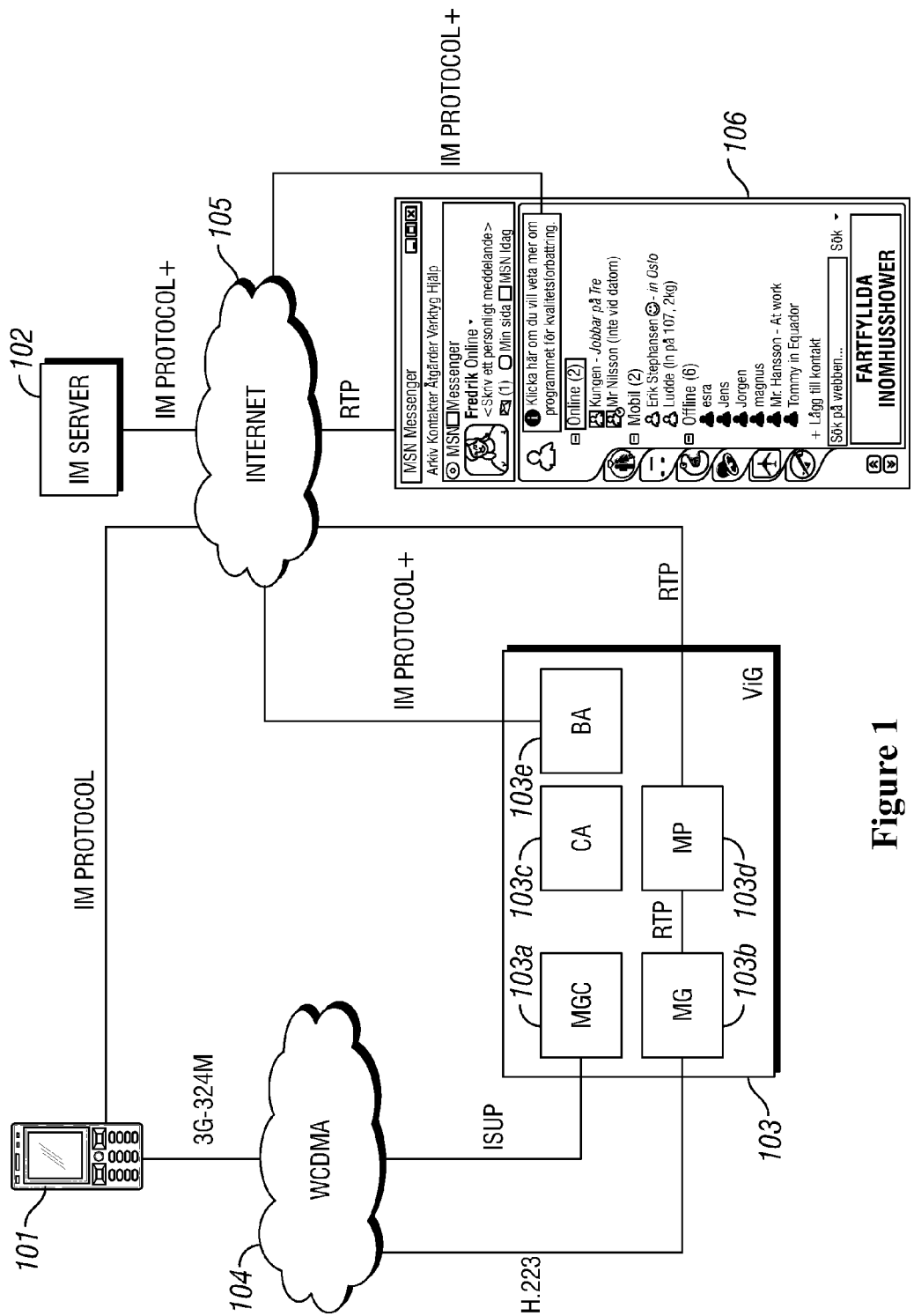
FIG. 1 is a schematic diagram representing a telecommunication network comprising Circuit Switched and Packet Switched networks.

Communication sessions between two or more communication partners can be achieved by communication session of many media types. Traditional Circuit Switched (CS) telecommunication networks support voice calls as a primary communication medium. The last few years the CS networks evolved to higher bandwidths supporting e.g. video and Multi Media as a communication medium. With the introduction of Packet Switched (PS) networks, such as the Internet, the traditional services at CS networks were also introduced at the PS networks and even more media became available. New telecommunication applications, mainly operated at PS networks such as messaging applications, were introduced.

One of these new messaging applications is an Instant Messaging & Presence (IM&P) application, as defined by the Internet Engineering Task Force (IETF) at the Request for Comments (RFC) 2773.

IM&P provides a method to present a subscriber the status, i.e. "presence", of another subscriber and to compose and send short messages to the another subscriber. Most implementations of IM&P provide a so called contact list or buddy list, presented by some display means, which indicates a number of tags, each representing a communication partner in the form of name#domain such as e.g. lars.magnum#ericsson.com, and where each tag has a visually presented actual status indication representing that the communication partner is e.g. on-line, temporary absent or not available.

A user of this IM&P application has to add communication partners to his contact list, by subscribing for this partner. By means of a dedicated IM&P server that executes processes with respect to e.g. authorization, authentication, presentation of the status of the subscribers and transferring messages, users are provided with medium as on-line chatting to each other.

Depending on implementation, users of such a IM&P application have the option no install this application as a client program on e.g. a PC, an Internet phone, or a mobile phone equipped with an interface to contact the Internet. As an example a Universal Mobile Telecommunication System (UMTS) telephone that applies a Wideband Code Division Multiple Access (WCDMA) access network may apply a PS channel to communicate to the Internet and provide an IM&P client application a channel to the IM&P server.

The invention will be explained by application of IM&P as an implementation of a message medium and UMTS as an implementation of a voice, video or Multi Media medium. However use of different media than messaging for setting up a communication session according to the method presented would be feasible. The method presented is also feasible to set up a communication session at different media than voice, video or Multi Media.

For the explanation the media to be set up shall be a Multi Media session communication, although other media types, such as voice and video can be set up by the method, and at this description the term "Multi Media" is interchangeable for "voice" or "video".

The term "setting up a call" or just "call" as a verb as a common term used at the CS technology environment is in this description regarded equal to the term "setting up a media session" as a common term used at the PS technology environment. "Setting up a call", "call" and "setting up a media session" all mean the initializing steps that, if successful, result into a communicative link between the entities involved.

A User Equipment (UE) also known to a person skilled in the art as terminal, communication device. Mobile Station (MS) or mobile, has client software installed that represents an Instant Message (IM) client.

As the presence part of an IM&P application is not relevant for the explanation of the invention, the remainder of this description does not mention the presence features although such features may be present at any implementation of the solution provided.

The IM client at the UE communicates to the IM server or IM&P server for the remainder of this explanation as to upload a contact list via a suitable PS channel. All contacts or "buddies" are shown at a display of the UE, together with their status.

A new principal as defined in IM terms, is called here a Border Agent (BA) that also, just as a "normal" UE has an Instant Message client that is registered at-and communicates to the IM&P server. Alternatively the BA communicates to the IM&P server via a Server to Server Protocol (SSP) and is in this case not registered to the IM&P server, and is able to retrieve information of registered IM clients and message sent by IM&P clients. The SSP allows the BA as well to provide the IM&P server with messages to be sent to IM clients.

The IM client at the BA is however a special client in that it is arranged to receive and detect an IM message that is composed according to a specific format and received from a specific UE. If an incoming IM message fulfills the requirements for format and sender, the BA attempts to establish a Multi Media connection between the UE and a communication device of a selected communication partner.

The IM client at the UE is adapted in that there is besides the usual subscription to the contacts, as presented at the contact list, also subscribed to the BA. The Contact list as presented by the IM client at the UE at the display of the UE, does not present the BA as a contact, but instead presents the presence of the BA as an icon at each tag of the contact list. A user of the UE wishing to set up a media session to a specific communication partner represented as a tag at his contact list, selects as an example the appropriate BA icon at the tag. The client IM at the UE subsequently queries the user at which media he prefers to have a communication session, where a number of media are presented to be selected. Alternatively the BA icon or icons can present the actually available communication media e.g. Multi Media, for the selected contact, thereby making the query redundant.

Although the BA is not shown or invisible as a tag at the contact list at the UE's display, the BA is able to sent IM messages to the UE, e.g. for network error information, call decline information or information about session invitation from a fixed IM client.

An IM message sent by the BA to the UE, comprising a predefined character string is not displayed by the IM client at a display of the UE but instead used for triggering an action at the UE. As an example at "/2" string is used to trigger an audio alert at the UE for predetermined period of time.

The IM client at the UE composes an IM message comprising, a User identification (UID or userid) associated with the UE, a UID representing the selected communication partner, and an indication which media type is requested for the communication session to be established.

The composed IM message can as a first alternative, just as according to know methods, be sent to the IM server that forwards the message to an instant inbox of the IM client at the BA.

As a second alternative, the composed IM message can be sent to the BA without interference of the IM server. At this second alternative the network address of the BA is made known to the IM client at the UE by means of the contact list as provided by the IM server, or made known in another way to the IM client at the UE, e.g. when an updated IM client is downloaded by the terminal from a server.

Further embodiments will now be explained with reference to the drawings:

In FIG. 1 a telecommunications network is schematically drawn indicating a number of network components with their communication channels.

This diagram, as well as the other diagrams, focuses on the issues required for explaining the invention, hence network entities not regarded as helpful for explanation are not depicted nor mentioned at the description.

As an example the network entities of the WCDMA network 104 with e.g. its Mobile Switching Centers (MSC) or Base Stations also known as Node-B's are not depicted. As another example the network entities at the Internet 105 with e.g. its Routers and Domain Name Servers are not depicted.

Connections depicted between entities are considered to represent the infrastructure required to setup and maintain such connection.

Schematic diagrams with messages communicated between the entities depicted are equally considered to depict only the entities helpful for explanation.

The UE 101 is communicatively attached to a CS technology based WCDMA network 104 by means of a third Generation (3G) protocol. The UE 101 is as well attached to the PS technology based Internet 105 by means of an IM protocol. The BA 103e with its IM client, as comprised by video Gateway (ViG) 103, is attached to the Internet 105 as well. The ViG further comprises a Media Gate Controller (MGC) 103a, a Media Gateway (MG) 103b, a Call Agent (CA) 103c and a Media Proxy (MP) 103d.

The CA 103c, BA 103e and MP 103d are PS technology based and interconnected. The MG 103b is under control of MGC 103a, and are considered as a gateway between CS and PS technology infrastructure. The MG 104b is communicatively connected to the MP 103d. All entities comprised by ViG 103 are arranged to exchange control signaling between each other. The entities 103a, 103b, 103c, 103d and 103e comprised by ViG 103 are not necessarily physically implemented at one location as depicted in FIG. 1, but may as well be located at several locations in the telecommunications network.

The IM server 102 is attached to the Internet 105. A UE 106 of another party, is represented as a contact list presented by an IM client at this UE 106, being a Personal Computer (PC), a Voice over Internet Protocol (VoIP), or any other PS enabled device for media sessions. This UE 106 is attached to the Internet 105 and arranged to communicate to the IM server 102 by means of an IM protocol, and to function as a communication device for the communication partner of the user of UE 101.

Figure 2:
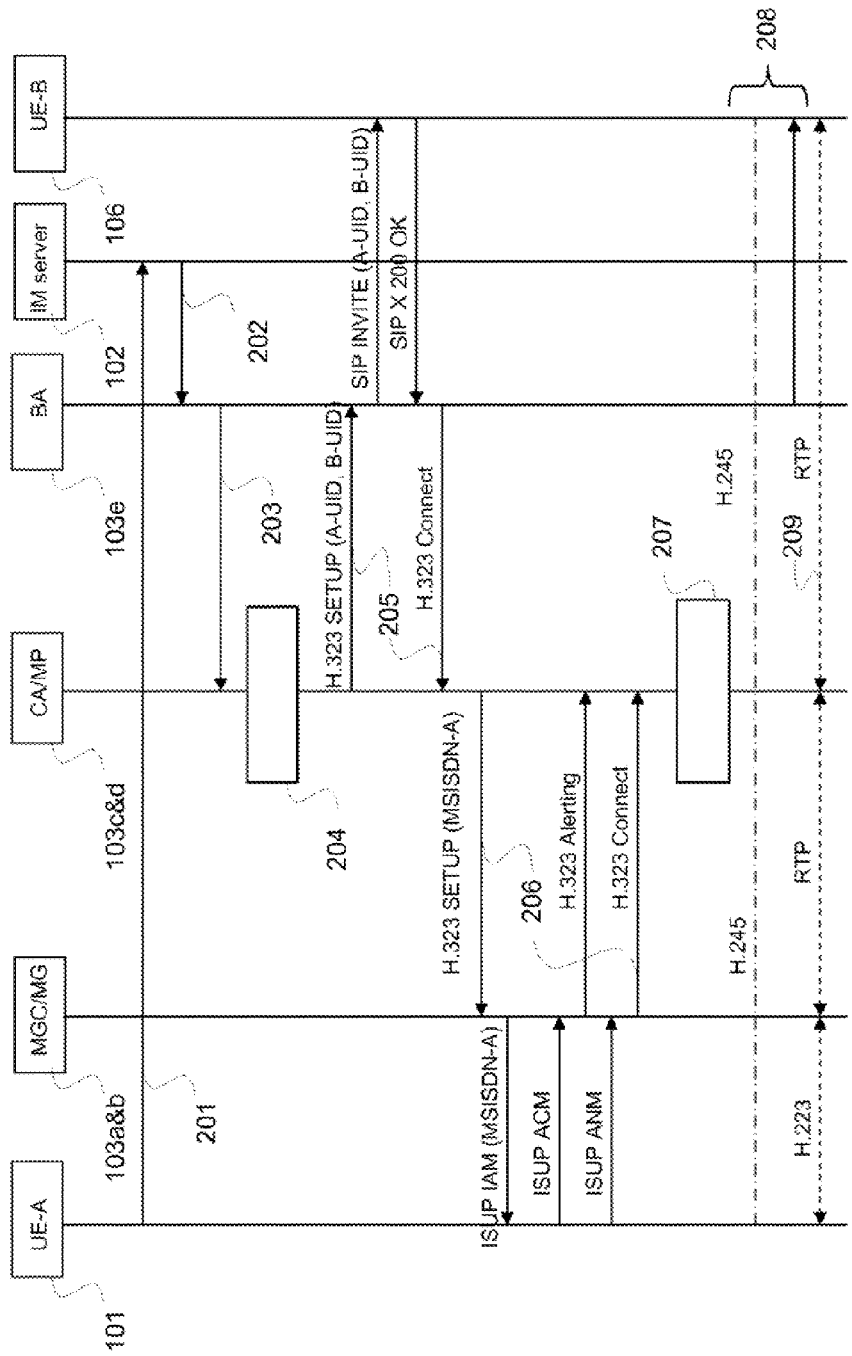
FIG. 2 is a schematic diagram of a session setup flow according to a first embodiment of the present invention.

FIG. 2 presents a schematic diagram depicting the messages communicated between the network entities of FIG. 1. This diagram represents a first alternative of a Multi Media session set-up from a UE at a CS technology based network towards a party with a UE residing at the PS technology based environment.

The indication of the UE where a call set-up is initiated is depicted as UE-A 101 and the device of the selected communication partner is depicted as UE-B 106 for all embodiments.

As a first step the UE 101 sends a composed IM message 201 comprising an A-UID, a B-UID and a media indication. The A-UID is the identification of the UE-A 101, the B-UID is an address as copied by the IM client at UE-A 101 from the contact list at UE-A 101 representing the communication partner selected by the user of UE-A 101, and the media indication is e.g. Multi Media.

This message 201 can be sent towards IM server 102 or alternatively to the BA 103c. If the IM server 102 receives the composed IM message 201, the IM server 102 forwards 202 the same composed IM message to the BA 103e.

On receptions of the IM message 202 or 201 from IM server 102 or UE-A 101 respectively the IM client at BA 103c transmits an eXtensible Markup Language (XML) message 203 with the same contents as the received IM message 201 or 202, towards CA 103c.

The CA 103c analyses the incoming XML message 303 and detects that a Multi Media medium is required for a media session between the A-UID and the B-UID.

For this and all other embodiment the BA 103e is optionally provided with means to check whether the A-UID comprised by the received IM message received from UE-A 101 is received from UE-A 101. BA 103e also has to have UE-A 101 at its own contact list as to preserve a number of credentials of UE-A 101. An operator maintaining BA 103e is enabled by means of this contact list to charge users of this IM based service for initializing calls.

The CA 193c subsequently checks which type of device UID-A represents. By retrieving 204 a network address of the UE-A 101 as given by UID-A at the received message 203 by means of an internal or external database, CA 103c defines from the Mobile Station Integrated Services Digital Network (MSISDN) network address type that UE-A 101 is a CS device and a Gateway has to be incorporated in the media session, given that UE-B 106 is a predetermined PS device.

The CA 103c subsequently retrieves 204 the Mobile Station Integrated Services Digital Network (MSISDN) number of the UE-A 101 as given by UID-A at the received message 203 by means of an internal or external database.

Using the MSISDN of UE-A 101, the CA 103c calls 205 the UE-B according to methods as known, and on a reception of a connect message from UE-B 106 subsequently calls 206 the UE-A 101 with the retrieved MSISDN number at step 204. At a reception of the connect message from UE-A 101, CA 103c instructs MGC/MG 103a&b and MP 103d to prepare for establishing a media bearer and subsequently negotiates 207 with UE-A and UE-B capabilities, media proxies and transport addresses. After accomplishment of a further media negotiation 208 between BA 103a and UE-B 106, both the UE-A 101 and UE-B 106 are ready to enter a media session 209 of the selected media type. CA 103c instructs MGC/MW 103a&b and MP 103d to establish the prepared connection 209 and subsequently a media bearer for Multi Media is available for UE's 101 and 106.

Figure 3:
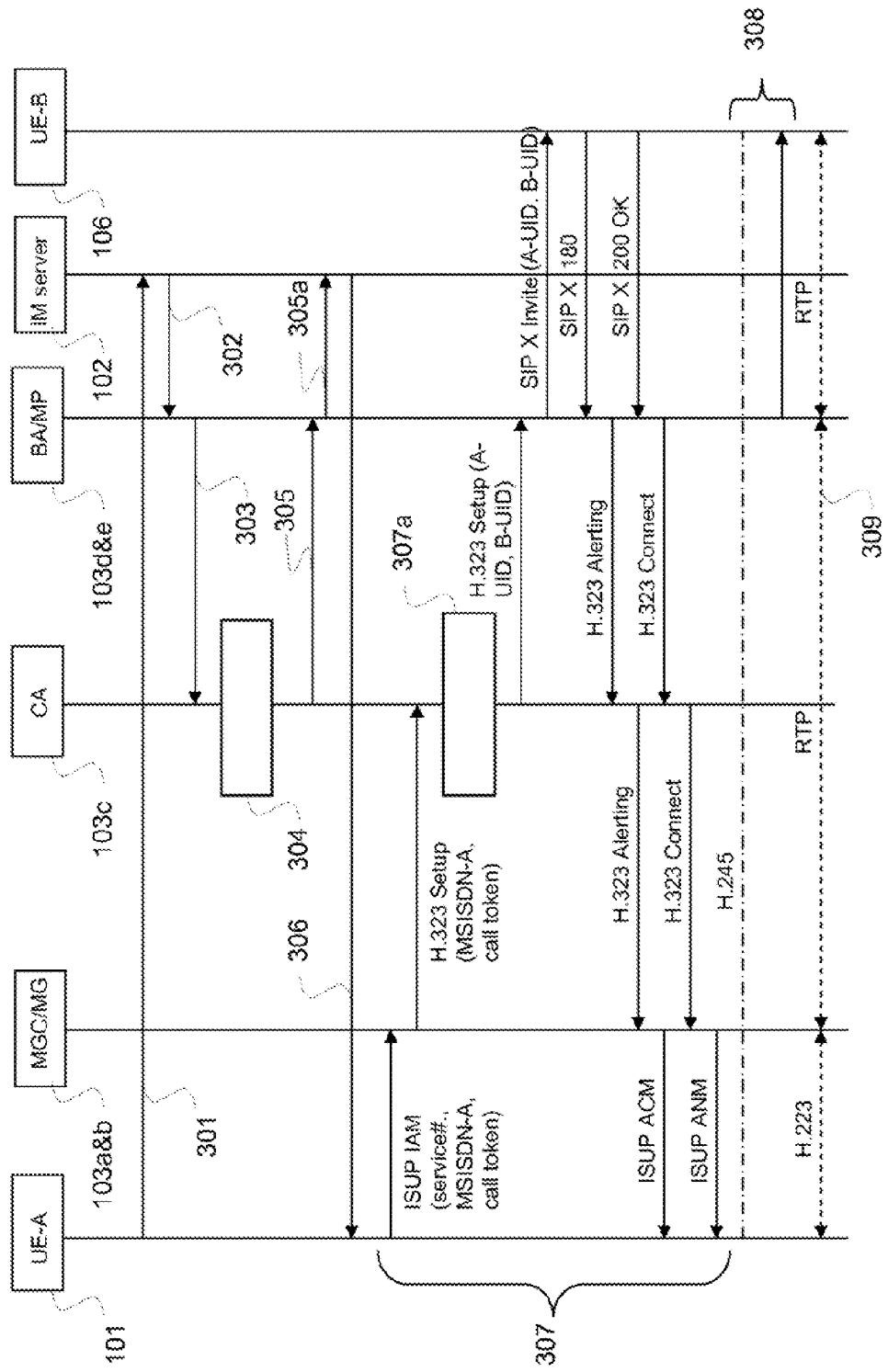
FIG. 3 is a schematic diagram of a session setup flow according to a second embodiment of the present invention.

FIG. 3 presents a schematic diagram where the messages communicated between the network entities of FIG. 1 are depicted.

This diagram represents a second alternative to initialize a Multi Media session set-up from a UE at a CS technology based network towards a party with a UE residing at the PS technology based environment.

As a first step the UE 101 sends a composed IM message 301 comprising an A-UID, a B-UID and a media indication. The A-UID is the identification of the UE-A 101, the B-UID is an address as copied by the IM client at UE-A 101 from the contact list at UE-A 101 representing the communication partner selected by the user of UE-A 101, and the media indication is e.g. Multi Media.

This message 301 can be sent towards IM server 102 or alternatively to the BA 103c. If the IM server 102 receives the composed in message 301, the IM server 102 forwards 302 the same composed IM message to the BA 103e.

On reception of the IM message 302 or 301 from IM server 102 or UE-A 101 respectively the IM client at BA 103c transmits an eXtensible Markup Language (XML) message 303 with the same contents as the received IM message 301 or 302, towards CA 103c.

The CA 103c analyses the incoming XML message 303 and detects that a Multi Media medium is required for a media session between the A-UID and the B-UID.

The CA 103c subsequently checks which type of device UID-A represents. By retrieving 304 a network address of the UE-A 101 as given by UID-A at the received message 303 by means of an internal or external database, CA 103c defines from the Mobile Station Integrated Services Digital Network (MSISDN) network address type that UE-A 101 is a CS device and a Gateway has to be incorporated in the media session, given that UE-B 106 is a predetermined PS device.

Using the MSISDN of UE-A 101, the CA 103c optionally generates or retrieves a unique call token and stores this call token for a predetermined period, say maximum 60 seconds. The call token is stored together with B-UID comprised by the received XML message 303.

This call token together with an acknowledge is sent to the BA 103e in an XML message 305. On reception of this acknowledgment and call token the BA 103e composes an IM message 305a with the same contents as XML message 305 and submits the IM message 305a to the IM server 102, destined for the IM client at UE-A 101. The IM-server 102 transfers the IM-message 306 subsequently to the instant inbox of UE-A 101. As an alternative BA 103e can send the composed IM message 305a towards the IM-client residing at UE-A 101 thereby bypassing IM server 120.

Optionally the IM message 306 comprises as well a service number of MGC 103a. The CA 103c instructs MGC 103a to be prepared to answer and connect an incoming call from UE-A 101 equal to the retrieved MSISDN and carrying the unique call token in its call set up message 307 to the CA 103c.

The IM client at UE-A 101, on reception of the IM message 306, instructs the CS interface of UE-A 101 call the MGC 103a by means of a preprogrammed service number or the service number provided by IM message 305 according to methods as known.

If the CA 103c receives the call 307 from UE-A 101 via MGC 103a, the received call token is matched 307a with the scored call token and on a match the stored UID-B is applied as a destination to continue the call originating from UE-A 101.
the remainder of call setup is accomplished according to call set up procedures as known and when realized MP 103d and MG 103b bridge the media session between UE-A 101 and UE-B 106.

At a reception of an answer from UE-B 106, UE-A 101 negotiates with UE-B 106 for capabilities, media proxies and transport addresses. After accomplishment of a further media negotiation 308 between MP 103d and UE-B 106, both the UE-A 101 and UE-B 106 are ready to enter a media session 309 of the selected media type.

As a further embodiment a set up of a media session from a UE 106 at a PS technology based network towards a party with a UE 101 residing at the CS technology based environment is presented.

An IM client residing an a PS technology device, such as a PC represented as UE 106, composes by means of a query at a user interface of UE 106 an IM message towards the BA 103e, the IM message comprising A-UID, B-UID and a desired media type. The BA 103e adds a predefined identifier to the IM message and forwards the adapted IM message towards the UE 101 associated with the B-UID with a session invitation. The IM client at the UE 101, receiving the IM message detects the predefined identifier and starts a program that presents at the display of the UE 101 a choice of "accept" or "decline" to the user. At an "accept" an IM message is sent to the BA 103e according to one of the embodiments shown above.

Alternatively the user of UE 106 can compose an IM message comprising a literal invitation for the UE 101 to set up a media session to the UE 106 preferably by means of one of the methods as shown above. A user of the UE-B simply has to initialize a call setup by selecting the tag of the communication partner that has sent the invitation according to the embodiments presented above.

The next presented embodiments allow to have a media session set up by a UE-A residing in the CS network environment to a UE-B also residing in the CS network environment, applying the application as a support to initialize the media session set up.

FIGS. 4 to 7 show an additional UE 107, representing a CS network based UE, and depicted as UE-C where UE-A 101 is the originating UE.

Figure 4:
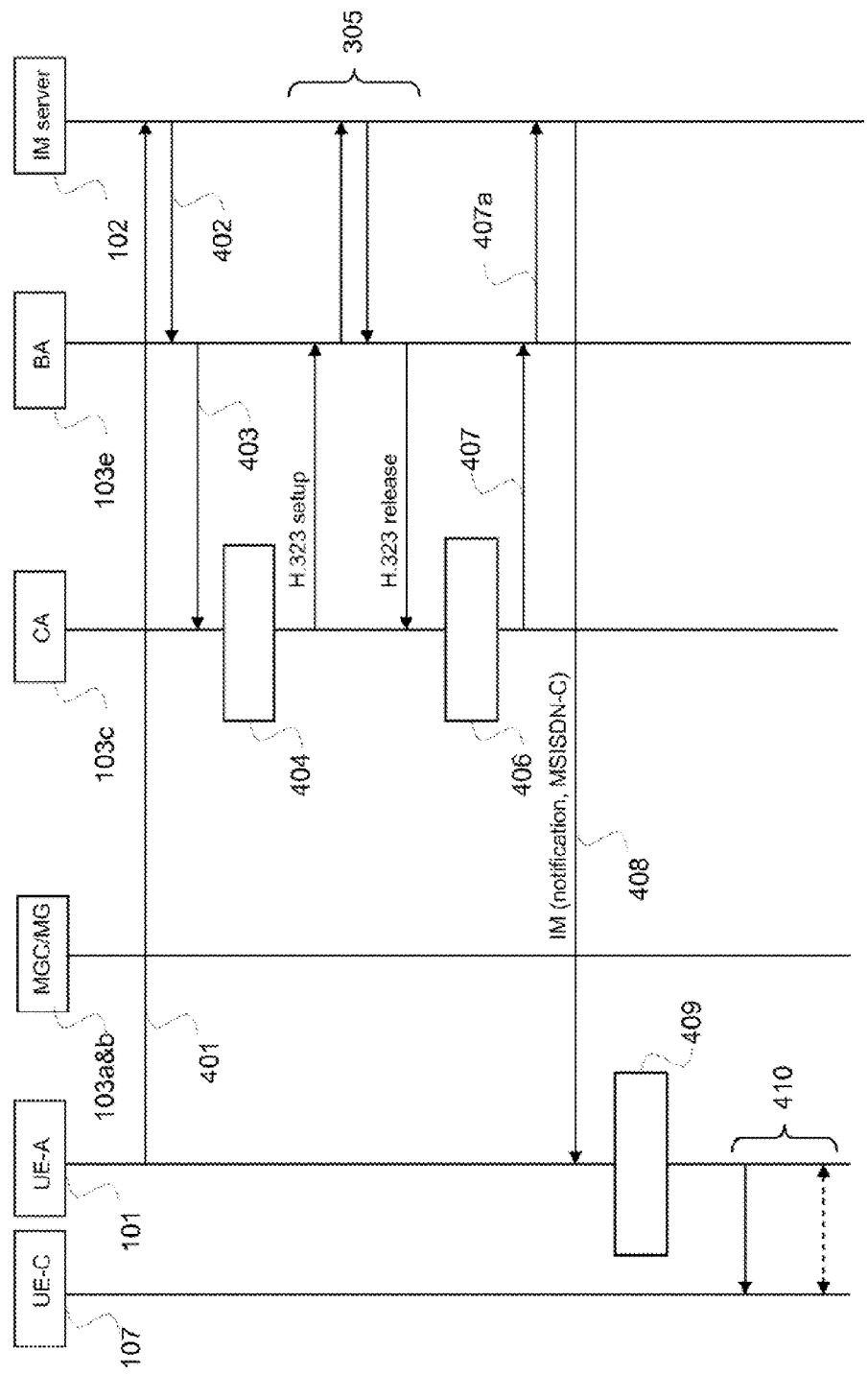
FIG. 4 is a schematic diagram of a session setup flow according to a fourth embodiment of the present invention.

FIG. 4 depicts schematically a diagram where an IM client at a CS technology environment UE initializes dialing of another UE at the same environment as to set up a Multi Media session, initialized by means of an IM protocol message.

As a first step the UE 101 sends a composed IM message 401 comprising an A-UID, a B-UID and a media indication. The A-UID is the identification of the UE-A 101, the B-UID is an address as copied by the IM client at UE-A 101 from the contact list at UE-A 101 representing the communication partner selected by the user of UE-A 101, and the media indication is e.g. Multi Media.

This message 401 can be sent towards IM server 102 or alternatively to the BA 103c. If the IM server 102 receives the composed IM message 401, the IM server 102 forwards 402 the same composed IM message to the BA 103e.

On reception of the IM message 402 or 401 from IM server 102 or UE-A 101 respectively the IM client at BA 103c transmits an eXtensible Markup Language (XML) message 403 with the same contents as the received IM message 401 or 402, towards CA 103c.

The CA 103c analyses the incoming XML message 403 and detects that a Multi Media medium is required for a media session between the A-UID and the B-UID.

The CA 103c subsequently checks which type of device UID-A represents. By retrieving 404 a network address of the UE-A 101 as given by UID-A at the received message 403 by means of an internal or external database, CA 103c defines from the Mobile Station Integrated Services Digital Network (MSISDN) network address type that UE-A 101 is a CS device and depending on the technology of the device represented by she B-UID a the media session is to be established with or without a Media Gateway.

CA 103c will make an attempt to request the IM service provider, by means of a request 405 to the IM server 102 whether the UE represented by the B-UID is available at a PS technology based environment. Optionally CA 103c will make an attempt to set up a call to the device represented by the B-UID as comprised by the initial IM message 401. In this case the B-UID does not represent a PS technology based device and hence the call attempt 405 fails and is indicated to the CA 103c.

Subsequently the CA 103c attempts to map and retrieve 406 the B-UID on a MSISDN number according to the same method of 404.

In case the B-UID represents an MSISDN number, CA 103c informs BA 103e of an successful mapping attempt and sends a message 407 to BA 103e. The message 407 comprises a notification and the MSISDN retrieved as represented by the B-UID, hereafter denoted as MSISDN-C, as it maps on UE-C 107.

The BA 103e composes an IM message with the same contents as XML message 407 and submits the IM message 407a to the IM server 102, destined for the IM client at UE-A 101. The IM-server 102 transfers the IM-message 408 subsequently to the instant inbox of UE-A 101. As an alternative BA 103e can send the composed IM message 407a towards the IM-client residing at UE-A 101 thereby bypassing the IM server 120.

The IM client at UE-A 101 optionally decides 409 whether to call out the MSISDN-C after a query by means of the user interface of UE-A 101, e.g. by requiring an "accept" of the user, or stop the media session setup attempt if the user has set an identifier "im2mob", see below, or the IM client of UE-A 101 calls out by default the MSISDN-C as provided by the IM message.

According to the last option, the IM client at the UE-A 101 instructs the CS interface of this UE-A 101 to call 410 UE-C 107 by means of MSISDN-C according to CS call set-up methods. If the UE-C 107 answers the media session set-up, the media session is established 410.

Figure 5:
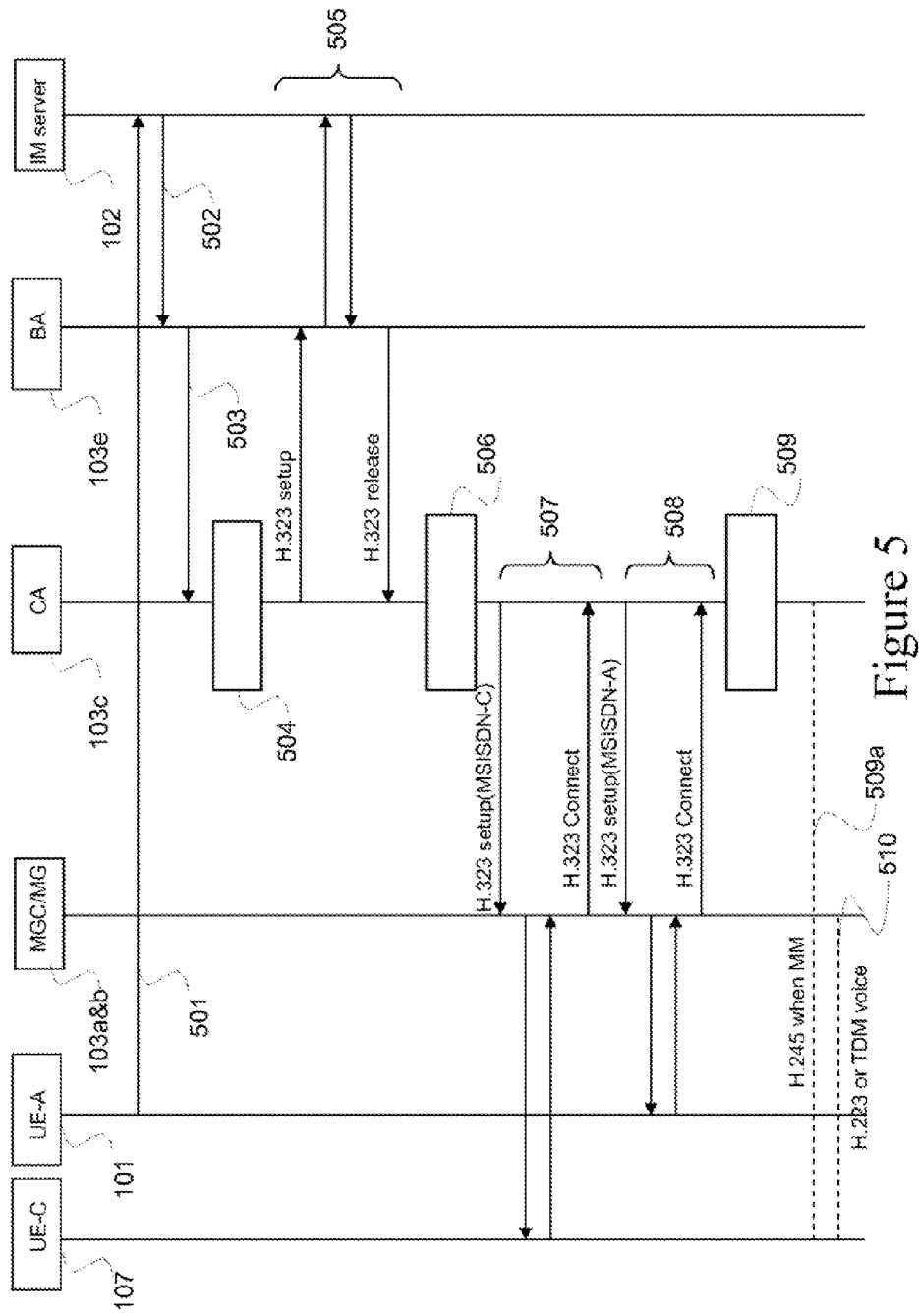
FIG. 5 is a schematic diagram of a session setup flow according to a fifth embodiment of the present invention.

FIG. 5 depicts schematically a diagram where a Call Agent server bridges calls between CS technology environment UEs as to set up a Multi Media session, initialized by means of an IM protocol message.

As a first step the UE 101 sends a composed IM message 501 comprising an A-UID, a B-UID and a media indication. The A-UID is the identification of the UE-A 101, the B-UID is an address as copied by the IM client at UE-A 101 from the contact list at UE-A 101 representing the communication partner selected by the user of UE-A 101, and the media indication is e.g. Multi Media.

This message 501 can be sent towards IM server 102 or alternatively to the BA 103c. If the IM server 102 receives the composed IM message 501, the IM server 102 forwards 502 the same composed IM message to the BA 103e.

On reception of the IM message 502 or 501 from IM server 102 or UE-A 101 respectively the IM client at BA 103e transmits an eXtensible Markup Language (XML) message 503 with the same contents as the received IM message 501 or 502, towards CA 103c.

The CA 103c analyses the incoming XML message 503 and detects that a Multi Media medium is required for a media session between, the A-UID and the B-UID.

The CA 103c subsequently checks which type of device UID-A represents. By retrieving 504 a network address of the UE-A 101 as given by UID-A at the received message 503 by means of an internal or external database, CA 103c defines from the Mobile Station Integrated Services Digital Network (MSISDN) network address type that UE-A 101 is a CS device and depending on the technology of the device represented by the B-UID a the media session is to be established with or without a Media Gateway.

In this case the B-UID does not represent a PS technology based device and hence the call attempt 505 fails and is indicated to the CA 103c.

CA 103c will make an attempt to request the IM service provider, by means of a request 505 to the IM server 102 whether the UE represented by the B-UID is available at a PS technology based environment. Optionally CA 103c will make an attempt to set up a call to the device represented by the B-UID as comprised by the initial IM message 501. In this case the B-UID does not represent a PS technology based device and hence the call attempt 505 fails and is indicated to the CA 103c.

Subsequently the CA 103c attempts to map and retrieve 506 the B-UID on a MSISDN number according to the same method of 504.

Figure 6:
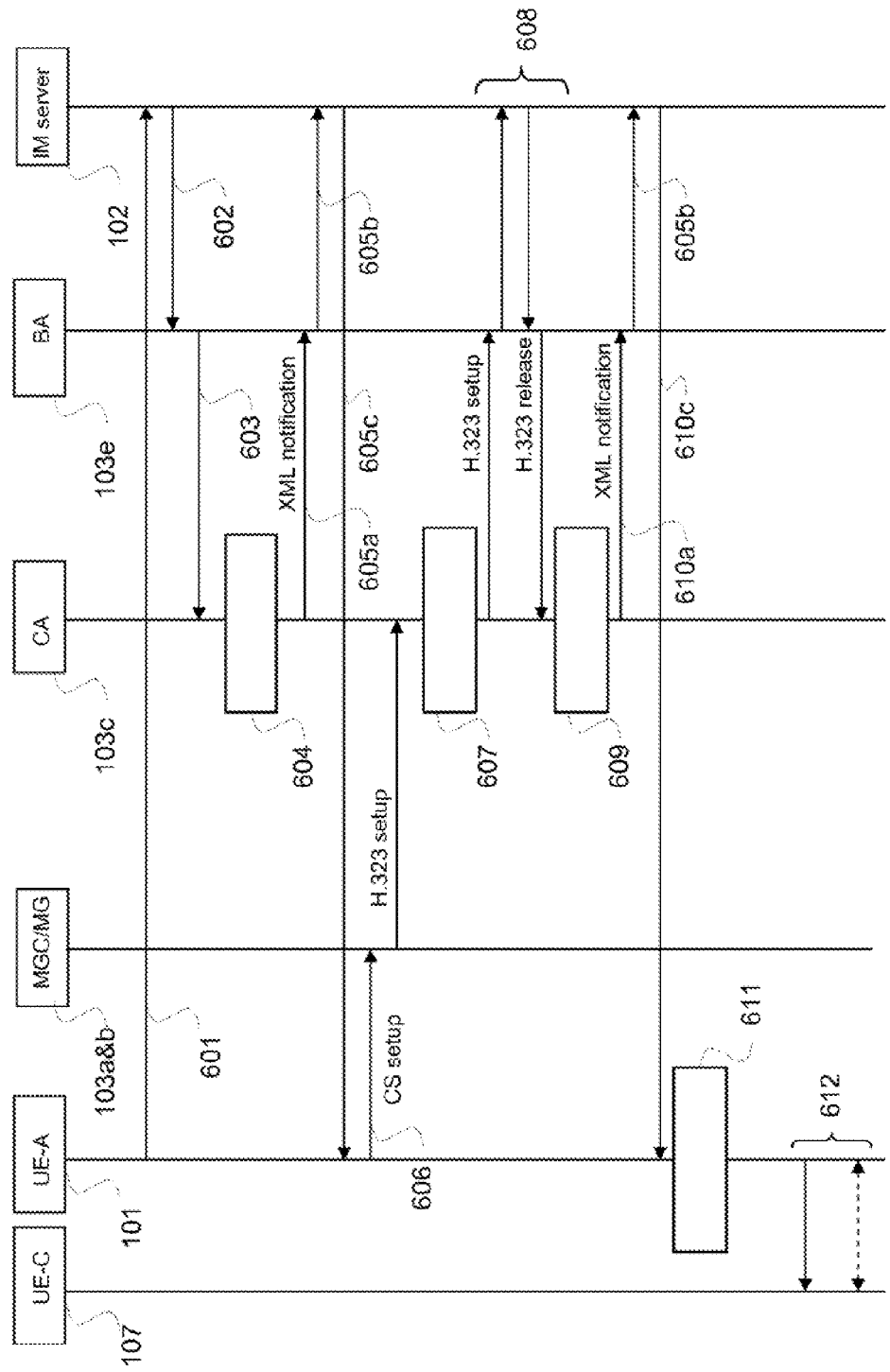
FIG. 6 is a schematic diagram of a session setup flow according to a sixth embodiment of the present invention.

In case the B-UID represents an MSISDN number maps on UE-C 107 and is hereafter denoted as MSISDN-C. CA 103c subsequently instructs MGC/MG 103a/b to prepare for a connection and CA 103c calls and bridges 507 & 508 the MSISDN-C and the MSISDN-A and after a negotiation 509 & 509a of capabilities and transport addresses at the MG 103b the media session bearer between UE-A and UE-C is established 510 via MG 103b FIG. 6 depicts schematically a diagram where a CS technology based UE attempts, after initialization by means of an IM message, to call a communication partner by means of CS method, assuming that the partner has a device residing at a PS technology based environment. As this partner resides at the CS the call fails and a subsequent call setup to a retrieved MSISDN finally succeeds.

As a first step the UE 101 sends a composed IM message 601 comprising an A-UID, a B-UID and a media indication. The A-UID is the identification of the UE-A 101, the B-UID is an address as copied by the IM client at UE-A 101 from the contact list an UE-A 101 representing the communication partner selected by the user of UE-A 101, and the media indication is e.g. Multi Media.

This message 601 can be sent towards IM server 102 or alternatively to the BA 103c. If the IM server 102 receives the composed IM message 601, the IM server 102 forwards 603 the same composed IM message to the BA 103e.

On reception of the IM message 602 or 601 from IM server 102 or UE-A 101 respectively the IM client at BA 103c transmits an eXtensible Markup Language (XML) message 603 with the same contents as the received IM message 601 or 602, towards CA 103c.

The CA 103c analyses 604 the incoming XML message 603 and detects that a Multi Media medium is required for a media session between the A-UID and the B-UID.

The CA 103c subsequently checks which hype of device UID-A represents. By retrieving 604 a network address of the UE-A 101 as given by UID-A at the received message 603 by means of an internal or external database, CA 103c defines from the Mobile Station Integrated Services Digital Network (MSISDN) network address type that UE-A 101 is a CS device and depending on the technology of the device represented by the B-UID the media session is to be established with or without a Media Gateway. The CA 103c stores the MSISDN associated with A-UID as MSISDN-A for a certain period, say 60 seconds, and stores the related data from the XML message 603, such as A-UID, B-UID and desired media type as well.

Subsequently the CA 103c composes a message comprising a CS technology based service number, associated with MGC/MG 103a&b, and additionally one B-UID and the desired media type as given by the XML message 603, and submits 605a this composed message according to an XML protocol including an acknowledgement to the BA 103e.

The BA 103e composes an IM message with the same contents as the XML message 605a and submits the composed IM message 605b to the IM server 102, destined for the IM client an UE-A 101. The IM-server 102 transfers the IM-message 605c subsequently to the instant inbox of UE-A 101. As an alternative BA 103e can send the composed IM message 605b towards the IM-client residing at UE-A 101 thereby bypassing the IM server 120.

The IM client at the UE-A 101, analyses the incoming IM message and presumes that the device associated with the B-UID resides at the PS network and hence should be reached by calling a gateway via the service number given. The IM client at the UE-A 101 instructs the CS interface of UE-A 101 to set up a CS call towards the service number comprised by the IM message 605. The call 606 comprises as additional parameters the MSISDN-A and the B-UID.

The MG/MGC 103a &b receives the incoming call 606 and forwards a call setup with the same additional parameters to the CA 103c.

The CA 103c matches the MSISDN-A parameter of incoming call 606 with the stored MSISDN-A and on a match CA 103c initiates a call 608 to the B-UID as provided as the additional parameter. As the B-UID does not reside at the PS environment the call 608 will fail and CA 103*c* is notified with a release message.

The CA 103*c*, now aware that the B-UID does not reside at the PS environment, subsequently attempts 609 to retrieve a CS environment network address by same method as applied at 604. On a retrieval of a MSISDN for the B-UID, indicated here as MSISDN-C, the CA 103*c* composes an XML message comprising A-UID, MSISDN-A and MSISDN-C and sends this message to BA 103*e*.

On receipt of the XML message 610*a*, BA 103*e* composes an IM message with the same contents as the XML message 610*a* and submits the composed IM message 610*b* to the IM server 102, destined for the IM client at UE-A 101. The IM-server 102 transfers the IM-message 610*c* subsequently to the instant inbox of UE-A 101. As an alternative BA 103*e* can send the composed IM message 610*b* towards the IM-client residing at UE-A 101 thereby bypassing the IM server 120.

The IM client at the UE-A 101 receives the IM message 610 and analyses 611 the IM message and determines that the call 606, initiated after reception of IM message 605*c*, failed and instructs the CS interface of UE-A 101 to abort the active call setup operation.

The IM client may optionally decide 611 whether to call out the MSISDN-C after a query by means of the user interface of UE-A 101, e.g. by requiring an "accept" of the user, or stop the media session setup attempt if the user has set an identifier "im2mob", see below, or the IM client of UE-A 101 calls out by default the MSISDN-C as provided by the IM message.

According to the last option, the IM client at the UE-A 101 instructs the CS interface of this UE-A 101 to call 612 UE-C 107 by means of MSISDN-C according to CS call set-up methods. If the UE-C 107 answers the media session set-up, the media session is established 612.

Figure 7:
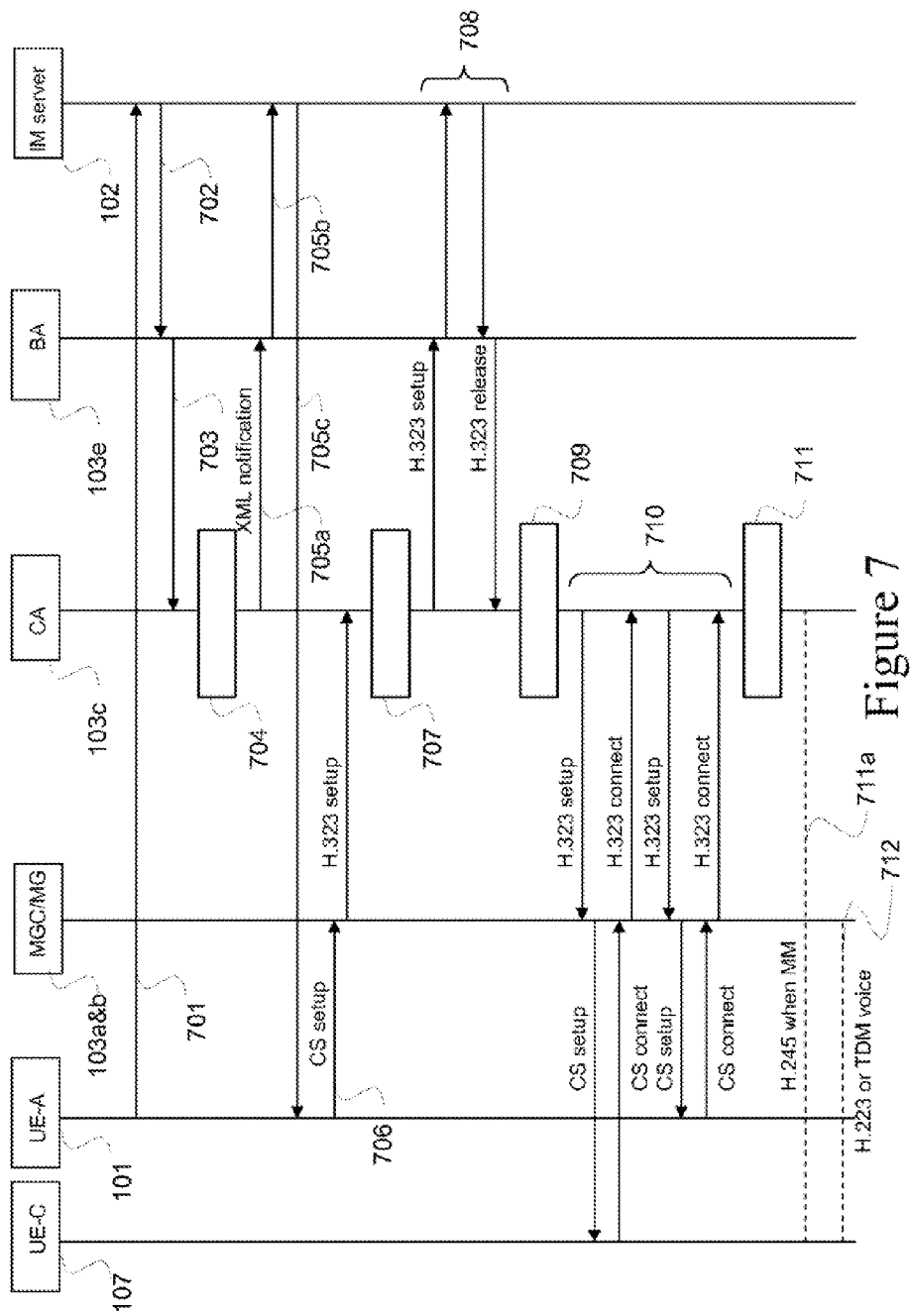
FIG. 7 is a schematic diagram of a session setup flow according to a seventh embodiment of the present invention.

FIG. 7 depicts schematically a diagram where a CS technology based UE attempts, after initialization by means of an IM message, to call a communication partner by means of CS method, assuming that the partner has a UE residing at a PS technology based environment. As this partner resides at the CS the call fails. Network element detect the failed call and initialize calls to both the originating UE and the UE of the communication partner and subsequently bridges the calls resulting in a media session.

As a first step the UE 101 sends a composed IM message 701 comprising an A-UID, a B-UID and a media indication. The A-UID is the identification of the UE-A 101, the B-UID is an address as copied by the IM client at UE-A 101 from the contact list at UE-A 101 representing the communication partner selected by the user of UE-A 101, and the media indication is e.g. Multi Media.

This message 701 can be sent towards IM server 102 or alternatively to the BA 103*c*. If the IM server 102 receives the composed IM message 701, the IM server 102 forwards 702 the same composed IM message to the BA 103*e*.

On reception of the IM message 702 or 701 from IM server 102 or UE-A 101 respectively the IM client at BA 103*c* transmits an eXtensible Markup Languages (XML) message 703 with the same contents as the received IM message 701 or 702, towards CA 103*c*.

The CA 103*c* analyses 704 the incoming XML message 703 and detects that a Multi Media medium is required for a media session between the A-UID and the B-UID.

The CA 103*c* subsequently checks which type of device UID-A represents. By retrieving 704 a network address of the UE-A 101 as given by UID-A at the received message 703 by means of an internal or external database, CA 103*c* defines from the Mobile Station Integrated Services Digital Network (MSISDN) network address type that UE-A 101 is a CS device and depending on the technology of the device represented by the B-UID the media session is to be established with or without a Media Gateway. The CA 103*c* stores the MSISDN associated with A-UID as MSISDN-A for a certain period, say 60 seconds, and stores the related data from the XML message 703, such as A-UID, B-UID and desired media type as well.

Subsequently CA 103*c* composes a message comprising a CS technology based service number, associated with the MGC/MG 103*a*&*b*, and additionally the B-UID and the desired media type as given by the XML message 703, and submits 705 this composed message according to an XML protocol including an acknowledgement to BA 103*e*.

On receipt of the XML message 705*a*, BA 103*e* composes an IM message with the same contents as the XML message 705*a* and submits the composed IM message 705*b* to the IM server 102, destined for the IM client at UE-A 101. The IM-server 102 transfers the IM-massage 705*c* subsequently to the instant inbox of UE-A 101. As an alternative BA 103*e* can send the composed IM message 705*b* towards the IM-client residing at UE-A 101 thereby bypassing the IM server 120.

The IM client at the UE-A 101, analyses the incoming IM message and presumes that the device associated with the B-UID resides at the PS technology based network 105 and hence should be reached by calling a gateway via the service number given. The IM client at the UE-A 101 instructs the CS interface of UE-A 101 to set up a CS call towards the service number comprised by the IM message 705. The call 706 comprises as additional parameters the MSISDN-A and the B-UID.

The MG/MGC 103*a*&*b* receives the incoming call 706 and forwards a call setup with the same additional parameters to the CA 103*c*.

The CA 103*c* matches the MSISDN-A parameter of incoming call 706 with the snored MSISDN-A and on a match CA 103*c* initiates a call 708 to the B-UID as provided as the additional parameter. As the B-UID does not reside at the PS environment the call 703 will fail and CA 103*c* is notified, with a release message.

The CA 103*c*, now aware that the B-UID does not reside at the PS environment, subsequently attempts 709 to retrieve a CS environment network address by same method as applied at 704. On a retrieval of a MSISDN for the B-UID, indicated here as MSISDN-C, the CA 103*c*

In this case the B-UID represents an MSISDN number that maps on UE-C 107 and is hereafter denoted as MSISDN-C. CA 103*c* subsequently instructs MGC/MG 103*a/b* to prepare for a connection and CA 103*c* calls and bridges 710 & 711 the MSISDN-C and the MSISDN-A and after a negotiation 711 & 711*a* of capabilities and transport addresses at the MG 103*b* the media session bearer between UE-A and UE-C is established 712 via MG 103*b*.

The UE-A 101 that initialized the media session set-up 706, either receives a release message as generated 709 by OA 103*c* and releases its media session set-up attempt 706, or releases its media session set-up attempt if the media session setup request 710 is received.

For all embodiments as explained above, on receiving the initial IM message 202, 302, 402, 502, 602, 702, or alternatively on receiving message 201, 301, 401, 301, 601 or 701, the CA 103*c* checks for the requested media type. The requested media type can be any of e.g. voice, video, Multi Media, IM, e-mail, SMS, Conference, etc. As in these embodiments IM is applied as a basic media session initialization, it win be explained what will occur if an IM message with requested media type "IM" is received.

If a user selects IM as a medium for a communication session with a selected communication partner it is a first option that the IM client at an UE-A 101 would not compose an IM message destined for the BA 103e as a "buddy", but instead the IM message is composed as a "normal" IM message and sent to the IM server 102 that will deliver the IM message to the inbox of the selected communication partner from the contact list.

As a second option the CA 103c, when receiving an XML message 203, 303, 404, 503, 603 or 703 comprising an identifier that indicates IM as a desired media type, composes a second IM message. This second IM message comprises the same contents as the received XML message 203, 303, 404, 503, 603 or 703, but is sent to the IM server 102 with a destination of the B-UID, as given at the XML message.

The media identifier is optionally deleted from at the composition of the second IM message.

For all embodiments where the IM client at the UE-A 101 has to perform an action at receiving one or more IM messages 306, 408, 605, 610, 705, each requiring specific action of the IM client at the UE-A 101, a predefined format and command parameters are suggested to be comprised by these IM messages as to enable a simple and efficient operation of the IM client. A string such as e.g. "\\CS-SETUP, service###, MSISDN-A, B-UID" instructs the IM client at the UE-A 101 to set up a CS call so service number "service###" and providing the call with additional parameters "MSISDN-A, B-UID". The one or more hashes "\\" indicate that an action has to occur instead of a display action. Comparable formats are suggested for calls no PS environments mutatis mutandis.

Optionally the composed message 201, 301, 401, 501, 601 and 701 may further comprise:

a) an identifier "IM-SP" representative for Instant Message Service Provider indicating the address of the IM service provider as to have a source to either check whether the B-UID is available as a PS technology based UE or to convert the B-UID into an network address. This IM-SP can also be used as an address in cases where the B-UID is to be called, such that the IM-SP responds with either the network address of the B-UID or replies with a negative acknowledgement If no network address for the B-UID is available.

b) an identifier "Mx" indicating a method to use, such as e.g. call back by the UE-A 101 or bridging by the CA 103c. "x" can be any number representing an associated numbered method.

c) an identifier "im2mob" indicating that in case the PS technology based UE of B-UID is not available, an attempt at the CS technology network is allowed or as to be prevented.

At the embodiments shown, both XML and H.323 communication protocols are depicted. These protocols are just used as an example as to implement the invention with available telecommunication products. An implementation using e.g. only Session Initiation protocol (SIP) or any suitable combination of appropriate protocols according to known methods would be feasible as well.

An option for all embodiments applying UE's having a local phonebook or address list, is to integrate the contact list, received from the IM server 102 with the phonebook, such that the display of a UE presents all names of the contact list and the phonebook, and in case a communication partner is selected that is only supported by the phonebook and hence not by the contact list, the IM client at the UE composes an IM message with A-UID and B-UID information of the phonebook, together with an identifier for the desired media type and transmits the composed IM message to the BA 103e. The BA 103e performs the initiation of the media session as shown above. Names present at both the phonebook and the contact list will be presented only once.

As an option for all embodiments where a device such as UE 101 or 106 initializes a media session setup by means of an IM message 201, 301, 401, 501, 601, 701 comprising A-UID and B-UID, an IM client at the UE-A 101 may have knowledge of UE-B's 106 MSISDN network address at the CS based network. 104 such as e.g. +10 12345 . . . or the PS address such as e.g. IP format 196.205.255 . . . of the A-UID or B-UID. In this case it is an option to compose the IM message 201, 301, 401, 501, 601, 701 including the known network address and subsequently skip the search 204, 304, 404, 504, 604, 704 for a e.g. a MSISDN network number.

By application of a protocol of an existent medium such as a chatting medium as provided by an Instant Messaging (IM) application as shown above, an advantageous solution is provided to initialize a media communication session at a different media types such as a voice, video or Multi Media by means of existent infrastructure, where this infrastructure is advantageously re-used, without the need for additional equipment, for non-standard communication protocols, substantial modifications or a restructured infrastructure By applying terminals that are capable for executing at least two different media such as e.g. Instant Messaging and Multi Media, the invention advantageously provides a single method to initialize different media in the same way. In this way the user experiences a simple method to initialize communication by multiple media without having to know or remember the specific user interfaces associated with each communication medium.

Multiple communication media available at a single device provide a low threshold for a user to apply the most appropriate medium and eventually switch an ongoing media session to another medium by means of a simple user action. The application of the solution as presented prevents the user to have knowledge of network addresses and specific user action if the communication device of the communication partner resides either at the CS or PS technology based telecommunication environment as provided by telecommunications operators. The solution provided is useful in cases where the MSISDN number of the called party is not known or available to a user as the solution, based on an IM B-UID identifier is enabled to find a MSISDN of the UE-B of the selected communication partner.

Conferencing by means of a conference bridge, provided by e.g. a gateway device such as Vig 103, where one or more terminals 101, 106 or 107 can be communicatively connected to, can be established by the method as provided by the invention. In this case a unique conference pin-code is to be provided by the IM client at the terminal 101 where the B-UID is associated with the conference bridge MSISDN number.

The UE 101, 106, 107 applied at the invention has a processing unit for having executing its operating system and has an Input/Output (I/O) unit communicatively connected to a keyboard as an input device and a display, the UE further comprises a network communication unit with a network connection to networks 104 and 105 and is adapted to send receive messages via said networks.

The processing unit comprises decision logic, timing logic and is connected to an internal memory for storing and retrieving program steps or variables.

The operating system allows a software IM client program to be executed and during executing of the IM client program, the I/O unit and the network communication unit are under control of the IM client program.

Implementation of the solution as presented enables a user to apply different media types such as voice, video, Multi Media, data, SMS, e-mail, IM or conferences with any of the aforementioned media.

What is claimed is:

1. A method of setting up a multimedia session from a circuit-switched first terminal toward a packet-switched second terminal in a telecommunication network, the method comprising the steps of:
    receiving in the network, an Instant Messaging (IM) message from the first terminal, the IM message including an identifier of the first terminal, an address of the second terminal, and an indication that the multimedia session is requested;
    sending from the network to the first terminal, a message that causes the first terminal to initiate setup of a circuit-switched call to an identified Media Gateway Controller (MGC); and
    setting up a packet-switched session between the MGC and the second terminal to complete the setup of the multimedia session from the first terminal to the second terminal.

2. The method according to claim 1, wherein the network receives the IM message from the first terminal in an Instant Messaging (IM) server, and the method includes forwarding by the IM server, the contents of the IM message to a Call Agent (CA).

3. The method according to claim 2, wherein the method includes:
    determining by the CA from the contents of the IM message that:
        a multimedia medium is required for the session;
        the first terminal is a circuit-switched terminal;
        the second terminal is a packet-switched terminal; and
        a media gateway must be incorporated into the media session;
    generating or retrieving by the CA, a unique call token that identifies the first and second terminals; and
    sending the call token from the CA toward the IM server.

4. The method according to claim 3, wherein the step of sending from the network to the first terminal, the message that causes the first terminal to initiate setup of the circuit-switched call to the MGC includes the IM server forwarding the call token to the first terminal in the message.

5. The method according to claim 4, wherein the first terminal identifies the MGC by one of the following steps:
    extracting a service number for the MGC from the message received from the IM server; and
    looking up a preprogrammed service number for the MGC upon receiving the message from the IM server.

6. The method according to claim 5, wherein the first terminal initiates the circuit-switched call to the identified MGC in response to receiving the call token, wherein the first terminal provides the MGC with the call token and the identifier of the first terminal.

7. The method according to claim 6, wherein the method also includes the CA instructing the MGC to connect to the CA, any circuit-switched call from the first terminal that includes the call token.

8. The method according to claim 7, wherein the step of setting up the packet-switched session between the MGC and the second terminal includes the steps of:
    sending a setup message from the MGC to the CA, the setup message including the call token and the identifier of the first terminal;
    utilizing the call token by the CA to associate the received setup message with the requested session between the first and second terminals; and
    utilizing packet-switched signaling to set up the session between the MGC and the second terminal.

9. A method of setting up a multimedia session from a circuit-switched first terminal toward a packet-switched second terminal in a telecommunication network, the method comprising the steps of:
    receiving in an Instant Messaging (IM) server, an IM message from the first terminal, the IM message including an identifier of the first terminal, an address of the second terminal, and an indication that the multimedia session is requested;
    forwarding the contents of the IM message to a Call Agent (CA);
    determining by the CA from the contents of the IM message that:
        a multimedia medium is required for the session;
        the first terminal is a circuit-switched terminal;
        the second terminal is a packet-switched terminal; and
        a media gateway must be incorporated into the media session;
    generating or retrieving by the CA, a unique call token that identifies the first and second terminals;
    sending the call token from the CA toward the IM server;
    forwarding the call token from the IM server to the first terminal;
    in response to receiving the call token, using a circuit-switched interface of the first terminal to initiate a circuit-switched call to an identified Media Gateway Controller (MGC), wherein the first terminal provides the MGC with the call token and the identifier of the first terminal;
    sending a setup message from the MGC to the CA, the setup message including the identifier of the first terminal and the call token;
    utilizing the call token by the CA to associate the received setup message with the requested session between the first and second terminals; and
    utilizing packet-switched signaling to set up the session between the MGC and the second terminal.

10. A Call Agent (CA) for setting up a multimedia session from a circuit-switched first terminal toward a packet-switched second terminal in a telecommunication network, wherein the CA is configured to:
    receive from an Instant Messaging (IM) server, content of an IM message forwarded from the first terminal, the IM message content including an identifier of the first terminal, an address of the second terminal, and an indication that the multimedia session is requested;
    determine from the contents of the IM message that:
        a multimedia medium is required for the session;
        the first terminal is a circuit-switched terminal;
        the second terminal is a packet-switched terminal; and
        a media gateway must be incorporated into the media session;
    generate or retrieve a unique call token that identifies the first and second terminals;
    send the call token from the CA toward the IM server;
    subsequently receive from a Media Gateway Controller (MGC), a setup message including the identifier of the first terminal and the call token;
    utilize the call token to associate the received setup message with the requested session between the first and second terminals; and initiate packet-switched signaling to set up the session between the MGC and the second terminal.

11. A circuit-switched (CS) terminal for a telecommunication network, the CS terminal comprising:
a processing unit coupled to a non-transitory memory, wherein when the processing unit executes computer program instructions stored in the non-transitory memory, the CS terminal is caused to:
send to an Instant Messaging (IM) server, an IM message including an identifier of the CS terminal, an address of a packet-switched (PS) terminal, and an indication that a multimedia session with the PS terminal is requested;
receive from the IM server, a unique call token that identifies the CS and PS terminals; and
in response to receiving the call token, utilize a CS interface of the first terminal to initiate a CS call to an identified Media Gateway Controller (MGC), wherein the first terminal provides the MGC with the call token and the identifier of the first terminal.

* * * * *